(No Model.)
H. L. T. OVERBEY.
FRUIT GATHERER.
No. 263,949. Patented Sept. 5, 1882.
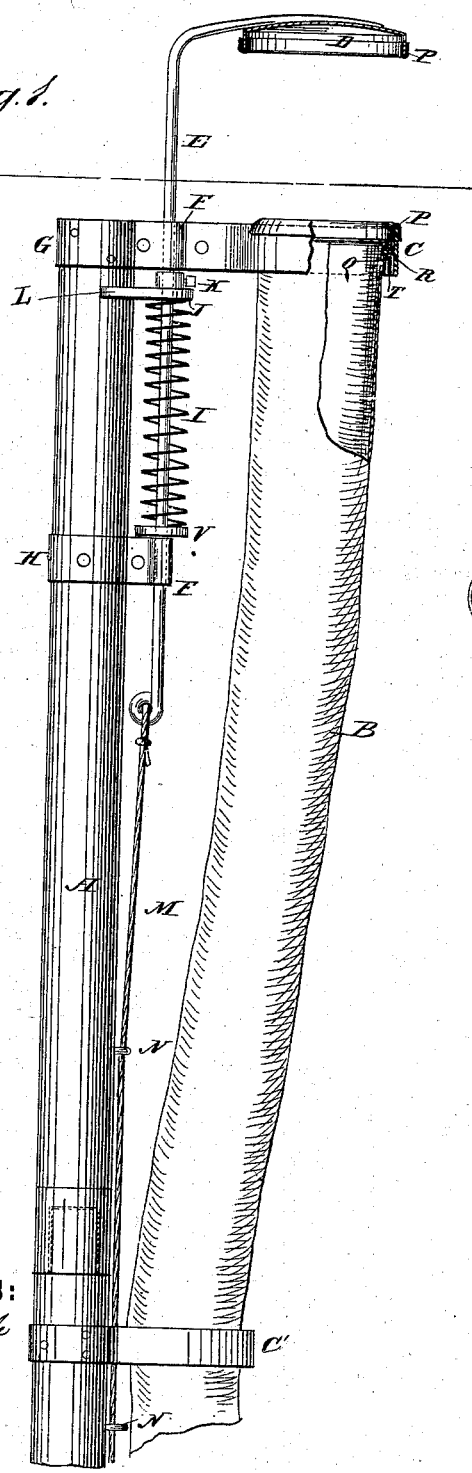
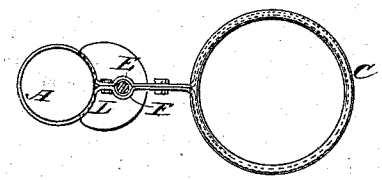
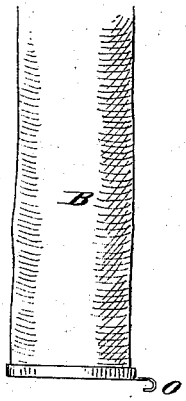
WITNESSES:
INVENTOR:
H. L. T. Overbey
BY
ATTORNEYS.

UNITED STATES PATENT OFFICE.

HUGH L. T. OVERBEY, OF SUBLIGNA, GEORGIA, ASSIGNOR TO HIMSELF AND WILLIAM P. JACKSON, OF SAME PLACE.

FRUIT-GATHERER.

SPECIFICATION forming part of Letters Patent No. 263,949, dated September 5, 1882.

Application filed June 2, 1882. (No model.)

*To all whom it may concern:*

Be it known that I, HUGH L. T. OVERBEY, of Subligna, in the county of Chattooga and State of Georgia, have invented a new and Improved Fruit-Picker, of which the following is a full, clear, and exact description.

This invention consists of an inverted-cup-shaped picker device located over the top of the hose-chute, on a rod, by which it may be pulled down from over the fruit to press it into the top of the hose and separate it from the branches, the said cup being raised afterward by a spring for successive operations, the hose, picker, and spring being suitably mounted on a staff, and a cord being attached to the picker and extending down the staff to the hand of the operator for pulling the picker down, as hereinafter described.

Reference is to be had to the accompanying drawings, forming part of this specification, in which similar letters of reference indicate corresponding parts in all the figures.

Figure 1 is a side elevation of my improved fruit-picker, with a part of the hose in section. Fig. 2 is a top view of the staff and hose and a section of the picker-rod, and Fig. 3 is a side elevation of the lower portion of the hose.

A represents the staff, to which the hose B is attached by a ring, C, at the top of the staff, in any approved way.

D is the picker, which consists of a shallow inverted-cup-shaped device, and is located directly over the top of the hose by the bent rod E, to which said picker is attached, and the rod is fitted in bearings F of bands G H, or other suitable devices, attached to the staff for the purpose, the said rod being so fitted that it can slide up and down in said bearings. The coiled spring I is applied to the rod E to raise the picker by resting on lower bearing, F, and lifting against a collar, J, fastened upon the rod by a set-screw, K, and having a broad bearing, L, against the side of the staff, to prevent the picker from swinging away from over the hose.

M represents the working-cord by which the picker is to be operated, said cord being attached to the lower end of the rod E and stretched along the staff A, through guide-eyes N, to the hand of the operator. The hose B also passes through guards C', attached to the staff for controlling it, and the lower end is provided with a hook, O, for connecting with the handle of the basket and holding it so that the fruit will escape from the hose into the basket. The upper edge of ring C, to which the upper end of the hose is attached, and the lower edge of the picker D will be covered with rubber, leather, or other soft substance, P, to protect the fruit from injury by the thin edges of the metal of which they are made. The hose may be attached to the collar C by a ring, Q, inside of said collar, with a flange or bead, R, to which the end of the hose is connected by draw-strings T, the object being to connect the hose detachably for changing it to pickers of different sizes for different kinds of fruit, different flange-rings Q having rings or beads R of different sizes, and the pickers D also being made in different sizes. The staff will be made in sections, detachably connected, for lengthening and shortening it at will.

A disk, V, is arranged on lower bearing, F, under spring I, for affording better support to the spring than the bearings alone do.

The height to which the spring I may lift the picker D may be limited by the location of collar J on the rod E.

Having thus fully described my invention, I claim as new and desire to secure by Letters Patent—

1. The combination, in a fruit-picker, of staff A, hose B, and picker D, said picker being an inverted-cup-shaped device located over the hose and arranged on a sliding rod, E, substantially as described.

2. The combination, in a fruit-picker, of staff A, hose B, picker D, sliding rod E, spring I, and cord M, substantially as described.

3. The sliding rod E, having picker D mounted on it, and being arranged in bearings F, attached to staff A, and provided with guard L, substantially as described.

H. L. T. OVERBEY.

Witnesses:
M. W. PONDER,
GEORGE R. PONDER.